June 22, 1965

R. G. WALKER ETAL 3,189,967

SAFETY DEVICE

Filed Jan. 21, 1963

INVENTOR.
ROBERT G. WALKER &
ROBERT B. TAYLOR

BY Albert L. Jeffers
attorney

June 22, 1965   R. G. WALKER ETAL   3,189,967
SAFETY DEVICE

Filed Jan. 21, 1963   3 Sheets-Sheet 2

INVENTOR.
ROBERT G. WALKER &
ROBERT B. TAYLOR
BY
Albert L. Jeffers
attorney

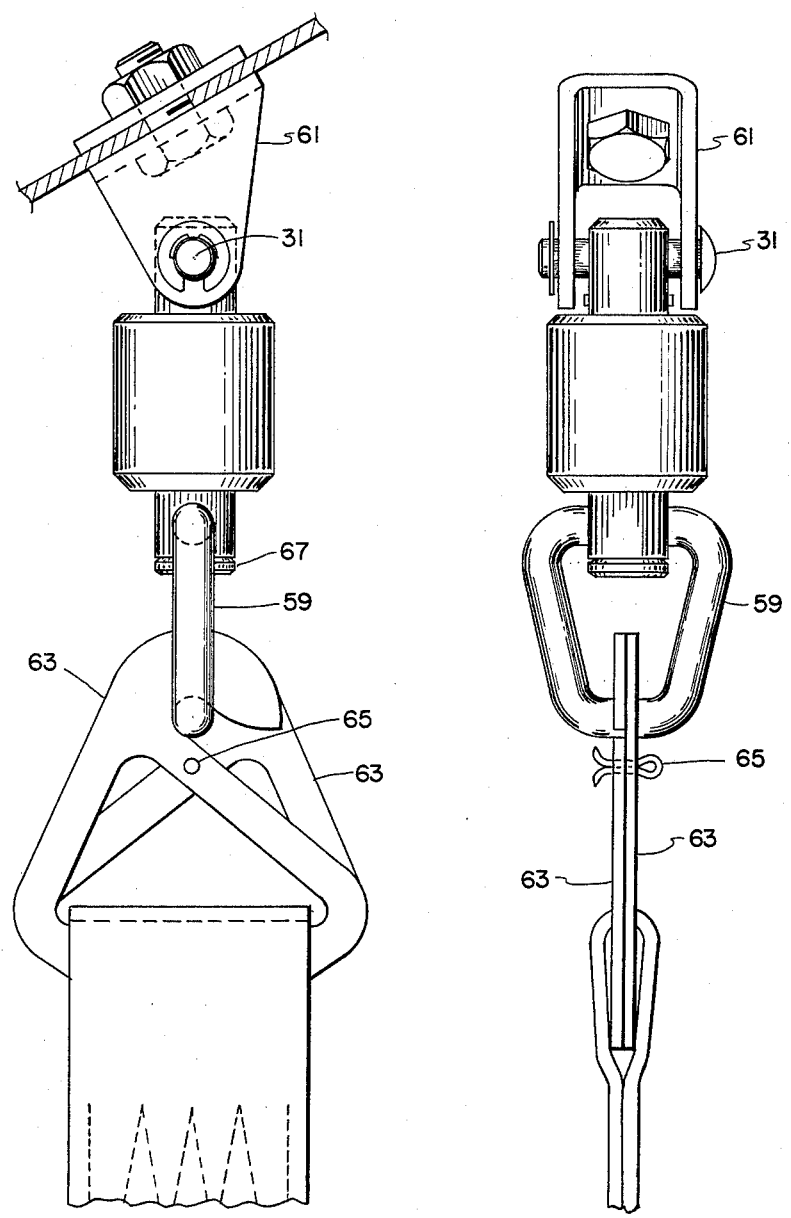

United States Patent Office 3,189,967
Patented June 22, 1965

3,189,967
SAFETY DEVICE
Robert G. Walker and Robert B. Taylor, Fort Wayne, Ind., assignors to Robert F. Brooks, Fort Wayne, Ind.
Filed Jan. 21, 1963, Ser. No. 252,914
8 Claims. (Cl. 24—265)

This invention relates to a safety device, and more particularly to one which is adapted for use with safety belts by which occupants are strapped into a seat and retained there in spite of high deceleration inertial forces. Seat belts or restraining devices for the purpose described are standard equipment in aircraft and are becoming more popular in automobiles, and may even become mandatory by legislation in many states because of their proven worth in reducing the incidence of injury and death due to accidents.

It has been found that even though safety belts provide a very useful function in holding a person in place, it is also important to provide that the person can quickly detach himself or be detached from the safety belt so that there is no danger of locking the person to his seat, especially after an accident has taken place. While the safety value of seat belts is not questioned as a general practice, there are occasions when a person in a wreck is so wedged in a position and perhaps unconscious, that it is very difficult for a rescuer to loosen or release the seat belt to permit removal of the injured person. Also, it is likely that such an injured and wedged-in person might well obstruct or prevent escape of another person whose avenue of escape is blocked.

Frequently, also, automobiles are wrecked in water, of various depths, or there may be fire which quickly envelops the vehicle, necessitating extremely quick removal of the injured. The fire hazard is very great in cases of wrecked automobiles or in aircraft in flight. The consequences of such retention of the person by the seat belt may be so severe, and the frequency is sufficient to point up the need for the safety device which automatically releases the seat belt or restraining device so that the person can invariably become free without the dangers of being held to the seat after heavy inertial loads have been encountered by the seat belt owing to decelerating forces which occur under accident conditions.

To overcome the difficulties indicated and provide quick positive release of the passengers held by safety seat belts, or other restraining devices of any design, the present invention produces an automatic belt release which can be used with any type of seat belt and which will not in any manner affect the ordinary use of the seat belt as far as the user is concerned, but upon a collision with some object at a speed which would be hazardous to the wearer thereof, the device will automatically release the belt from its fasteners in a predetermined period of time after such accident. This period can be developed from records of past accidents and will be of only a few seconds at most.

It is, therefore, one of the main objects of the present invention to provide a safety device in combination with seat belts, other restraining devices and the like, which is capable of sustaining the tension loads encountered during loading of the seat belt, or restraining device, but without releasing.

It is a further object of the present invention to provide a safety device for seat belts and the like which will automatically operate once a high decelerative force is encountered and will, after a predetermined delayed period, automatically break a connection between the seat belt and a fixed structure so that the person is or may be automatically freed.

A still further object of the present invention is to provide a safety device of uncomplicated construction which will operate automatically and with sufficient reliability to provide substantially 100% recurrence of operation under the intended operating conditions. Therefore, the hazard of being blocked within a wrecked vehicle or the like, because of inaccessibility of the hand release portion, or unconsciousness of wearer due to injury, is substantially eliminated.

Other objects and features of the present invention, will become apparent from a consideration of the following description which proceeds with reference to the accompanying drawings, in which a selected example embodiment is set forth to illustrate the invention, and wherein:

FIGURE 8 illustrates the invention showing one view of a means of fastening and incorporating the belt release mechanism to a suitable floor anchor on one end and to a standard belt fastener clip or set of clips or plates on the opposite end; and FIGURE 9 is a view of the belt release mechanism illustrated in FIGURE 8 rotated 90 degrees.

Figure 1:
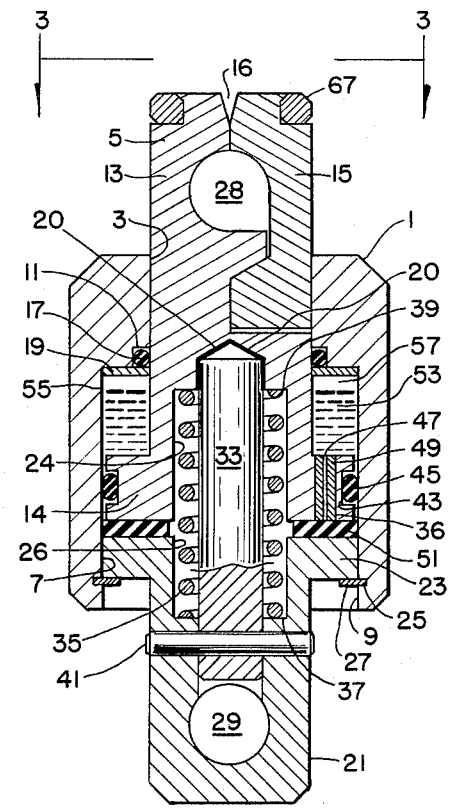
FIGURE 1 is a part sectional view of the release unit, showing details of construction.

Referring now to the drawings and first to FIGURE 1, a mechanically strong cylindrical body 1, preferably of steel but which may be of other suitable strong material, is provided with a partially closed end through which a smooth opening or hole 3 is provided. The opening 3 is adapted to accommodate a sectional shaft or pin 5 composed of parts 13, 15 and 67. The cylindrical opening 3 of body 1 extends into same for approximately one third of the length of said body 1. The remainder of body 1 has a substantially greater inside diameter, as shown, forming a cylinder 7 with the end 9 open.

At the inside terminus of the cylindrical section 7 and adjacent to the inside terminus of the cylindrical opening 3 a shoulder 11 is provided to accommodate an O ring seal 17 which is held in place by a retaining ring 19.

A stub shaft or pin 21 having an outwardly extending integral flange 23 is adapted to fit into the open end 9 of the cylinder 7 and is retained in the cylinder by a retainer ring 27 positioned in a recess or groove 25.

The end of the stub shaft or pin 21 which extends outwardly along the axis of the assembly is provided with a transverse opening 29 for receiving a bolt 31 (FIGURES 4 to 9) or some other suitable fastening device for anchoring the safety device to the body of the vehicle.

It will be noted that the inside parts of the flanged stub shaft 21 and the opposite section 13 of the shaft assembly have been drilled or bored to receive an extension pin 33, which pin is welded or fastened firmly to section 13 at 20. If desired the pin 33 can be constructed integral with the part 13.

Cylindrical recesses 24 and 26 having a diameter larger than the extension pin 33 are provided in the part 13 and in the pin 21 respectively. It should be noted that the pin 33 must fit freely into the bore of pin 21 avoiding any chance of binding which would restrict its movement when the latter might be required. However, the pin 33 must have a closely controlled clearance in order to maintain the shear value of pin 41 within reasonable limits. A stiff compression spring 35 is adapted to be positioned in the recesses 24 and 26 to exert a substantial force between the shoulder 37 on pin 21 and shoulder 39 formed on part 13 when the safety device is properly assembled.

The spring 35 is held compressed by a shear pin 41 which is designed to shear or yield to a force of proper value presently of the order of 2000 to 3000 pounds on each end of the belt. It is to be understood that the safety device is not limited to these values. Other devices will yield on application of a certain predetermined force such as a spring loaded ball in socket, and would be equally suitable for the purpose intended.

The inside end of part 13 is also provided with a relatively thick flanged section 14. Around the periphery of the flange 13 a groove 43 is provided for receiving an O ring 45, or other suitable liquid seal. Through one part of the flange 14 there is a very small diameter opening or passage 47 through which a suitable liquid may freely pass when under the urge of adequate pressure. The opening or passage 47 may be most accurately constructed by the use of a section of tubing 49 having a small inside diameter 47. The tubing 49 is disposed in a bore 36 in the flange 14. If desired the actual area of the free opening 47 in the tubing 49 can be controlled by inserting one or more needle-like pins (not shown) into the opening to control the rate of liquid flow therethrough.

The flange 14 is held firmly against a resilient sealing ring 51 in the assembled position by a shear pin 41 which is inserted through the stub shaft 21 and pin 33. In this position the spring 35 is compressed tightly exerting a predetermined force against the shoulders 37 and 39. A suitable liquid 53 is disposed in the chamber 55 formed between the retaining ring 19 and the flange 14.

It should be noted that in the annular space 55 the liquid 53 is not normally under pressure and does not completely fill the chamber leaving a small air space 57. The liquid used in the annular space 55 should have a relatively constant suitable viscosity over a wide range of temperatures, and for this reason certain silicones are suggested. Other type liquids such as glycol may be used as no lubrication is required; however, all such liquids should have no rust or corrosion properties and should have relatively low vapor pressures to avoid evaportion from the chamber, even though the chamber is sealed as tightly as possible and to avoid internal buildup of pressure within the chamber. Also, the air should not react with the liquid and thus become unavailable as a cushion.

Since the release mechanism is to be held in tension with a seat belt, being fastened at one end by bolt 31 to an anchorage 61 and fastened at the opposite end by any suitable means such as ring 59 and metal clips 63 held together by pin 65, to the belt itself, an accident which would cause the wearer to be thrown forward would cause a greatly increased force to be exerted on the assembly parts 13, 14 and 15, and consequently upon the ring 59. The opening 28 of the release mechanism through which the belt fastener 59 is attached is always the proper end of the release mechanism to which the safety belt should be attached.

Assuming that a substantial force is exerted on the belt and transmitted to the ring 59, and assuming that the force exceeds the shear strength of pin 41, the pin 41 will be sheared thereby releasing the extension pin 33, permitting the entire assembly 33, 13, 14, 15 and 67 to move along the axis since spring 35 is under tight compression and exerts a substantial force along the longitudinal axis of the device.

Figure 7:
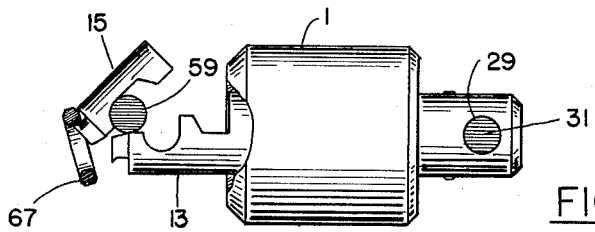
FIGURE 7 is a view taken after the belt connection is fully released.
Figure 6:
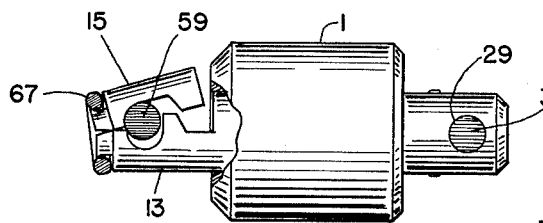
FIGURE 6 is a view showing the mechanism beginning to release the belt attachment.
Figure 5:
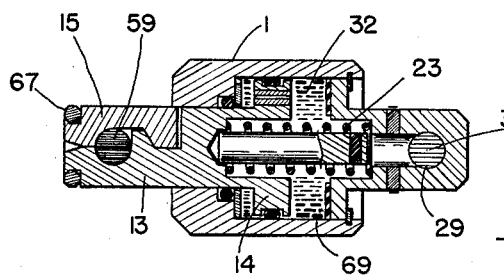
FIGURE 5 is a part sectional view showing the position of the mechanism immediately before the action which releases the belt attachment.
Figure 4:
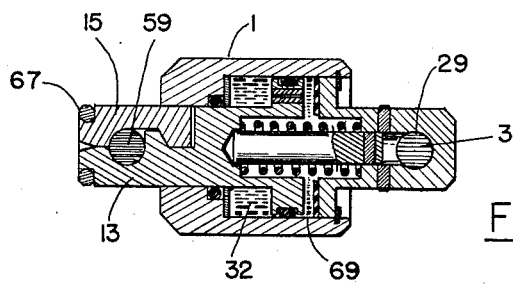
FIGURE 4 is a part sectional view of the mechanism illustrated in FIGURE 1 after the release motion of the parts begins the shearing of the shear pin.

This force, after compression of air in the chamber 55, is transferred to and resisted by the liquid 53 in chamber 55. As a result, the liquid 53 is forced through passage 47 and the force moves the assembled parts 13, 14, 15 and 67 outwardly. Since the force of the spring 35 is sufficiently great alone to cause the assembly to move outwardly until part 15 is released regardless of any other forces applied, this movement will continue at a predetermined minimum rate until the belt connection is released, as illustrated in FIG. 7. The samll amount of air or gas 57 along with the liquid in chamer 55 is compressed in order to allow initial movement sufficient to cause pin 41 to shear. It is obvious that if liquid completely filled the chamber 55 the shear pin 41 would not likely be sheared since all liquids are relatively incompressible, and substantially no movement of pin 33 with relation to pin 21 would take place even under very substantial force.

As soon as pin 41 is sheared, there is no longer any fixed restraint on spring 35, the force of which then causes the assembly 13, 14, 15 and 67 to move outwardly from the cylindrical body 1 at a predetermined rate, which rate is governed by the rate of flow of the liquid from chamber 55 through the very small passage 47 in the tube 49 to the space 69 (FIGS. 4 and 5) created by the movement of the flange 14. The assembly 13, 14, 15 and 67 will continue to move outwardly while liquid 53 is passing through the tubular passage 47 into the space 69 illustrated in FIGS. 4 and 5.

Under this condition there is no resistance to any force which readily causes the assembly 15, 59 and 67 to fall apart when the end of part 15 clears the opening 3, as illustrated in FIG. 7, thus releasing the ring 59 and permitting the seat belt to be released.

The amount of residual force to which the seat belt is subjected has no substantial bearing on the action of the release mechanism. When the shear pin 41 is broken to release the pin 33 the force of spring 35 will cause the release action even though no other force be applied on the seat belt ends at that time. However, a strong maintained applied force by the belt will tend to accelerate the release mechanism. It shall be noted that such a force is not likely to be a high percentage of a total of 2500 lbs. and thus will cause little difference in time of operation.

Figure 3:
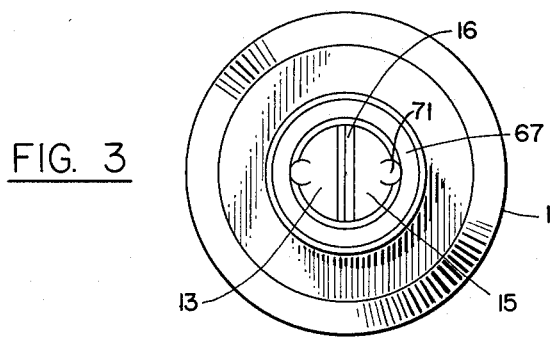
FIGURE 3 is an end view of the unit taken along the line 3—3 in FIGURE 1.
Figure 2:
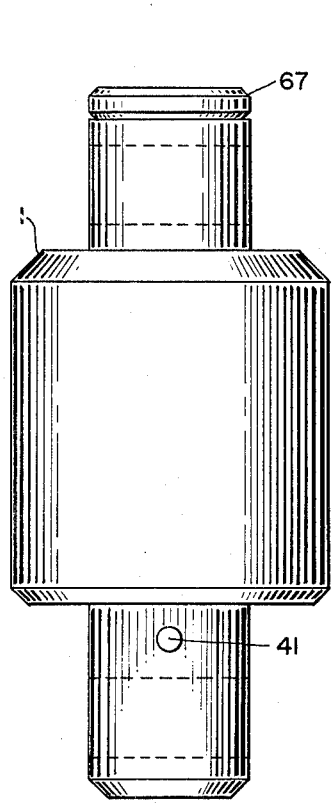
FIGURE 2 is a view of the release unit illustrated in FIGURE 1 rotated 90 degrees.

There is comparatively little side thrust on sections 13 and 15 which might be expected to cause objectionable friction against the walls of the body 1 even though a very small outward force prevails. This is due to the positioning of ring 67 around the outward end of the sections 13 and 15 as shown in all the FIGURES. The ring 67 holds the sections 13 and 15 in proper relation until the lower end of section 15 is released as it passes out of the cylindrical hole 3 in body 1, at which time the ring 59 is pushed away. This action is made possible by tapering the sections 13 and 15 to form a V designated at 16 (FIGURES 1 and 3) to permit the sections 13 and 15 to swing outward, unimpeded by the ring 67. The ring 67 is held in place by staking as indicated by the reference number 71 in FIG. 3.

In operation, the size of the opening 47 provides enough time so that the inertial forces are dissipated at the time the connection is terminated. That is, once the conditions which caused the inertial loading of the belt is terminated, this generally occurring within a matter of a few milliseconds, the succeeding time interval required to move the shaft 13 against the resistance of the liquid 53 and effect opening is long enough so that there is no further requirement for the seat belt at the time it releases (FIG. 7).

The release of the seat belt will occur, even though no further tensile force is exerted on the seat belt because the compression spring 35 will provide the necessary force.

If the person should exert force on the seat belt after an initial force which severs pin 41, this will tend to urge section 14 with a force in addition to that of the compressed spring 35 and will therefore tend to hasten the action of the release mechanism. However, even in the absence of such accelerating force the spring 35 is adequate to fully effect release within a short period of time sufficient to allow the vehicle to come to rest after an impact resulting in sufficient deceleration to shear the pin.

It will be seen from the foregoing description that the invention provides a quick positive release of the passengers which are held by safety seat belts, or other restraining means, of any design and it is possible to incorporate the automatic belt release with any type of seat belt without affecting its ordinary usage. After a collision the device will automatically release the belt within a predetermined period of time without any further requirement.

It is anticipated that such problems as wedging of persons within a seat while they are unconscious with the seat belt fastened, or where the person might not be able to open the buckle release, is totally obviated by means of the present invention. It is anticipated that this problem of recovering persons who are located within a wrecked vehicle, will be greatly facilitated by the automatic release of the seat belt. Since all persons are released from their seat belts, this will solve the problem of blockage of escape route by other persons who might find their avenue impeded by a passenger who is detained by his seat belt.

It will be appreciated from the foregoing explanation of an embodiment of the invention that there is added an important safety device for use with seat belts without in any way detracting from their original value.

It is reasonable to be expected that those skilled in the art can make numerous revisions and adaptations of the invention to suit individual design preferences. It is intended that such revisions which incorporate principles of the disclosed invention, will be included within the scope of the following claims as equivalents of the invention.

We claim:

1. A restraining device having an automatically releasable operation, and comprising:
    (a) anchor means adapted for securement with a fixed structure,
    (b) force-transmitting means adapted to be operatively connected to a restraining means for holding a person against relatively free movement,
    (c) a severably releasable member adapted to transmit loads between said force-transmitting means and anchor means,
    (d) damping means providing time-delayed relative movement between said force-transmitting means and anchor means when said releasable member is severed,
    (e) and resilient spring means adapted to automatically effect time-delayed displacement between said anchor means and force-transmitting means when said releasable member is severed, said force transmitting means including means for automatically releasing the restraining means upon the completion of the time delayed displacement.

2. An automatically releasable connection for safety belts to retain occupants against dislocation by inertial loads and thereafter released after a predetermined period, comprising:
    (a) a first force-transmitting member having an operative connection with a seat belt and including a jaw adapted to be normally closed in a retracted position and automatically opened in an extended position,
    (b) a second force-transmitting member having an operative connection with a foundation structure,
    (c) a severably releasable connection between said first and second members which provides relative motion therebetween at the outset of an inertial load and through which said inertial forces are initially sustained,
    (d) and a fluid chamber including a metering orifice forming a second connection between said first and second members when the releasable connection is severed to provide a time delay displacement before the consequent release of said jaw, said force-transmitting means including means for automatically releasing the seat belt upon the completion of the time delayed displacement.

3. The releasable connection in accordance with claim 2 including a compressed resilient member effective to automatically urge said members apart when the releasable connection is severed.

4. The structure in accordance with claim 2 wherein said fluid chamber includes a compressible fluid medium whereby forces are transmitted principally through the releasable connection between said force-transmitting members, and a substantially incompressible liquid which is transmitted through said metering orifice and forms the medium of force transmittal between said two members when the releasable connection is severed.

5. A safety appliance in combination with seat belts and the like providing an automatically releasable connection comprising:
    (a) a first stem having a piston at one end thereof and first means at the opposite end thereof forming a force-transmitting connection,
    (b) second means for yieldably urging said first means to open position,
    (c) a second stem having a force-transmitting connection and a severably releasable connection with said first stem by which force is transmitted therebetween up to a magnitude of predetermined amount,
    (d) a cylinder member surrounding the adjoining ends of said stems and providing a sealed fluid chamber reciprocably receiving the piston of said first stem and further including an opening for said first stem which holds said first means in closed position during a predetermined stroke length of said piston,
    (e) a fluid medium within said cylinder, and a metering orifice in said piston providing initially free movement of said first stem whereby force is transmitted between said first stem and the releasable connection and movement of said first stem is after release of said connection,
    (f) and a force transmitting connection between said cylinder and second stem whereby force is transmitted between the stems through the fluid medium as a function of fluid metering operation to provide a delayed extension of said stems and a consequent release of said first means.

6. The safety appliance structure of claim 5 including a spring compressed within said cylinder and adapted to urge said stems apart when the releasable connection is severed to effect automatically a metering action and spreading of said stems apart whereby said first means is opened.

7. The safety appliance structure in accordance with claim 5 including sealing means for confining the fluid within said chamber and located one at each of the opposite ends of said chamber.

8. A safety device for seat belts and the like having an automatically releasable operation, and comprising:
    (a) anchor means adapted for securement with a fixed structure,
    (b) restraining means for holding an occupant against substantial free movement,
    (c) connecting means including a severable member disposed between the restraining means and anchor means,
    (d) said connecting means including a chamber having a substantially incompressible fluid and a compressible fluid and a limited outlet for said incompressible fluid,
    (e) resilient spring means compressed within said connecting means and adapted to effect displacement between said anchor means and said connecting means when said severable member is severed, and
    (f) said connecting means including releasing means effective to automatically separate said anchor means and said connecting means after they have been displaced to an extent providing a desired time delaying action by metering action of said incompressible fluid through the limited outlet.

References Cited by the Examiner

UNITED STATES PATENTS

| | | |
|---|---|---|
| 2,483,044 | 9/49 | Gongwer _____ 294—83.1 |
| 2,522,790 | 9/50 | Johnson. |
| 2,837,370 | 6/58 | Stott et l. |
| 2,942,911 | 6/60 | Stott. |

FOREIGN PATENTS 327,092  6/03  France.

OTHER REFERENCES

Flight, volume LXI, issue 2266, published June 27, 1952, page 767.

DONLEY J. STOCKING, *Primary Examiner*.